(12) United States Patent
Khojastepour et al.

(10) Patent No.: US 8,520,764 B2
(45) Date of Patent: Aug. 27, 2013

(54) LINK LAYER MULTICASTING SYSTEMS AND METHODS

(75) Inventors: Mohammad A. Khojastepour, Lawrenceville, NJ (US); Mohammad A. Khajehnejad, Pasadena, CA (US); Karthik Sundaresan, Howell, NJ (US); Sampath Rangarajan, Bridgewater, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 58 days.

(21) Appl. No.: 13/194,083

(22) Filed: Jul. 29, 2011

(65) Prior Publication Data

US 2012/0027117 A1     Feb. 2, 2012

Related U.S. Application Data

(60) Provisional application No. 61/369,332, filed on Jul. 30, 2010, provisional application No. 61/447,374, filed on Feb. 28, 2011.

(51) Int. Cl.
*H04L 27/00* (2006.01)

(52) U.S. Cl.
USPC ............................ 375/285; 375/267; 375/259

(58) Field of Classification Search
USPC ......................................... 375/285, 267, 259
See application file for complete search history.

(56) References Cited

U.S. PATENT DOCUMENTS

2006/0165191 A1*  7/2006  Lin et al. ..................... 375/267
2011/0059705 A1*  3/2011  Tajer et al. ................ 455/114.3

OTHER PUBLICATIONS

Lozano, A. "Long-Term Transmit Beamforming for Wireless Multicasting" IEEE International Conference on Acoustics, Speech & Signal Processing (ICASSP'07). Apr. 2007. pp. 417-420.
Matskani, E., et al. "Efficient Batch and Adaptive Approximation Algorithms for Joint Multicast Beamforming and Admission Control" IEEE Transactions on Signal Processing, vol. 57, No. 12. Dec. 2009. pp. 4882-4894.
Sidiropoulos, N., et al. "Transmit Beamforming for Physical-Layer Multicastinng" IEEE Transactions on Signal Processing, vol. 54, No. 6. Jun. 2006. pp. 2239-2251.

* cited by examiner

*Primary Examiner* — Kenneth Lam
*Assistant Examiner* — Michael Neff
(74) *Attorney, Agent, or Firm* — Joseph Kolodka

(57) ABSTRACT

Beamforming systems and methods are disclosed. In accordance with one method, indications of channel matrices for a plurality of receivers are obtained. Further, a beamformer matrix is formulated as a linear combination of columns of hermitians of the channel matrices. In addition, coefficients of the hermitians in the linear combination are determined to compute the beamformer matrix such that a lowest reception rate among reception rates of each of the receivers is maximized. Data signals are transmitted to the receivers by applying the computed beamformer matrix to data symbols to maximize the lowest reception rate.

9 Claims, 5 Drawing Sheets

US 8,520,764 B2

LINK LAYER MULTICASTING SYSTEMS AND METHODS

RELATED APPLICATION INFORMATION

This application claims priority to provisional application Ser. No. 61/369,332 filed on Jul. 30, 2010 and to provisional application Ser. No. 61/447,374 Feb. 28, 2011, each of which is incorporated herein by reference.

This application is related to commonly owned application Ser. No. 13/194132, entitled 'BEAMFORMING SYSTEMS AND METHODS FOR LINK LAYER MULTICASTING'), which is filed concurrently herewith and is incorporated herein by reference.

BACKGROUND

1. Technical Field

The present invention relates to wireless communications and, more particularly, to beamforming methods and systems.

2. Description of the Related Art

The proliferation of mobile devices has increased the demand for applications (streaming media, software updates, etc.) and services (location-based, social networking, etc.) involving group communications. To support such applications, designs of efficient link layer wireless multicasting solutions are needed. The advancement in antenna array technology and the associated mechanisms that it enables (MIMO, beamforming, etc.) have become a standard feature in next generation broadband access networks (WiMAX, LTE-Adv). In beamforming, the signal is transmitted using a beam pattern that reinforces the signal towards the desired client, while minimizing the leakage of signal power in undesired directions. Given that the multicast performance is largely determined by the bottleneck client (with poor channel conditions) in the group, beamforming is an attractive candidate for multicasting, as it can improve the channel conditions of the bottleneck client. However, a beamforming vector optimized for one client may not be effective for another client. Given that multiple clients should be served simultaneously in multicast systems, an effective solution should balance the beamforming benefits with the ability to effectively cover multiple clients.

SUMMARY

One embodiment is directed to a beamforming method. In accordance with the method, indications of channel matrices for a plurality of receivers are obtained. Further, a beamformer matrix is formulated as a linear combination of columns of hermitians of the channel matrices. In addition, coefficients of the hermitians in the linear combination are determined to compute the beamformer matrix such that a lowest reception rate among reception rates of each of the receivers is maximized. Data signals are transmitted to the receivers by applying the computed beamformer matrix to data symbols to maximize the lowest reception rate.

Another embodiment is directed to a computer readable storage medium comprising a computer readable program. The computer readable program, when executed on a computer, causes the computer to perform a beamforming method. In accordance with the method, indications of channel matrices for a plurality of receivers are obtained. Further, a beamformer matrix is formulated as a linear combination of columns of hermitians of the channel matrices. In addition, coefficients of the hermitians in the linear combination are determined to compute the beamformer matrix such that a lowest reception rate among reception rates of each of the receivers is maximized. The computed beamformer matrix is applied to data symbols to generate transmit signals that maximize the lowest reception rate.

An alternative embodiment is also directed to a beamforming method. The method includes determining a receiver that has a lowest reception rate among reception rates of each of a plurality of receivers by utilizing an expectation over a set of expected channel matrices for multiple time blocks for each of the receivers that is based on a particular beamformer matrix. The particular matrix is incremented by an increment that is based on a gradient of an objective function denoting the reception rate for the determined receiver with respect to the particular beamformer matrix. The determination and the incrementing is iterated until a value based on the increment falls below a threshold to obtain a resultant beamformer matrix. The method further includes transmitting data signals to the receivers by applying the resultant beamformer matrix to data symbols to maximize the lowest reception rate.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
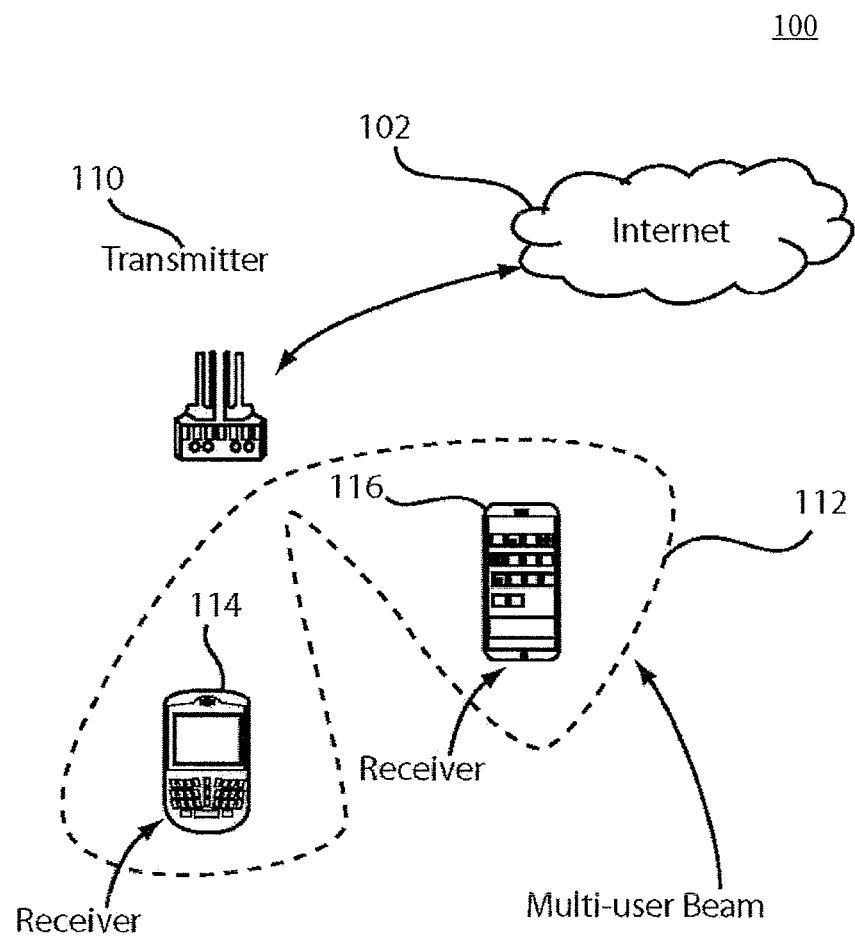
FIG. 1 is a high-level block diagram of an exemplary beamforming system.

Exemplary embodiments described herein below consider the problem of designing adaptive beamforming solutions where a beamforming vector can be computed on the fly based on channel state information (CSI) fedback from the clients. This problem and subsequent solutions are different from solutions that implement multicasting using switched beamforming where beamforming vectors, which are normally single-lobed directional patterns, are selected from a set that is a priori computed and stored at the transmitter. Switched beamforming solutions do not require CSI and can utilize only the received SNR (signal to noise ratio) at the clients (for each beam in the a priori selected set) as feedback. The problem of designing optimal beamforming vectors for multicasting is difficult, mainly due to its nonconvex nature. Beamformer designs can be categorized into two classes: short-term and long-term beamforming. In the case of short-term beamforming, instantaneous CSI from the clients is available at the transmitter and the objective is to optimize instantaneous performance. Works in this category design the beamformer for a given set of users or jointly optimize admission control and beamformer design. While short-term beamforming aids in understanding the nature of multicast beamforming, it is difficult to enable instantaneous feedback in practical systems. This has led to the importance of long-term beamforming, wherein average CSI estimates are alone available at the transmitter. The objective here is to design a beamformer that can be applied over several frame (packet) transmissions so as to optimize average case performance. Embodiments described herein apply efficient beamformer designs for both short-term and long-term beamforming.

For short-term beamforming, embodiments maximize the minimum instantaneous rate of clients in the group (subject to power constraints), which is equivalent to minimizing the power (subject to rate constraints). An efficient beamforming method that is guided by the KKT (Karush-Kuhn-Tucker) conditions of the primal non-convex problem is described. In particular, as described herein below, the beamforming or precoder matrix can be formulated as a linear combination of channel vectors of the receivers, thereby significantly simplifying its determination. The method finds the coefficients of the linear combination successively by orthogonalizing the channel vectors and calculating the coefficients by successively satisfying the constraint in turn with equality. Moreover, the procedure can find the greedy optimal values for the linear combination by minimizing the norm of the resulting beamforming vector at each step. The greedy nature of the problem enables fast convergence.

To evaluate the efficiency of the method, the corresponding dual convex problem is solved. The dual convex problem serves to bound the performance of the primal. As discussed in more detail below, the duality gap is zero for real channels, in which case the method converges to the optimal solution. For general (complex) channels, the method converges to a solution that is close to the dual bound in practice. Simulations confirm that the greedy method usually converges to a near-optimal point due to its proximity with the dual bound. Further, the method significantly improves upon existing methods both in terms of convergence and performance.

In addition, we uncover and leverage a hidden convexity of the optimization problem under certain channel conditions, which happens frequently for practical systems that behave in accordance with the Rayleigh fading channel model. The condition depends on a matrix defined as a linear function of the dual solution for the given set of user channels and the user channels. Further, the condition is characterized by the multiplicity of the largest eigenvalue of this matrix. To determine the beamformer under these conditions, the dual problem is solved and a uniqueness condition is checked. If satisfied, it is shown that the duality gap is zero and the solution of the primal problem is optimal and is obtained based on the solution of the dual problem. If the uniqueness condition is not satisfied, then the suboptimal greedy approach, which, as indicated above, can be derived based on the optimality conditions from the Lagrangian formulation, can be applied. The method significantly improves the multicast performance over known solutions. Simulation results have shown that, in most scenarios of interest, the method is completed in the first step with high probability. It should be noted that the method may be used to find the optimal solution for some other quadratically constrained quadratic programming (QCQP) optimization problems.

For long-term beamforming, the goal is to maximize the minimum average rate of clients in the group. This is significantly different than maximizing the minimum average SNR. Similar to the short-term beamforming case, an efficient greedy procedure for the beamformer design that outperforms prior methods is described. A dual solution is also provided to bound the performance as well as to establish the efficiency of the greedy procedure.

Referring now in detail to the figures in which like numerals represent the same or similar elements and initially to FIG. 1, an exemplary beamforming system 100 that determines beamformers for multicast transmission of data in accordance with an exemplary embodiment of the present invention is illustrated. As shown in FIG. 1, the system 100 may include a wired network, such as the internet 102, and transmitters or base stations 110, each of which includes a plurality of transmitting antennae to generate beams for transmission of information to receivers. Each transmitter 110 may be configured to employ a multi-user beam 112 to communicate with a plurality of wireless receivers, such as receivers 114 and 116. Although only two receivers are illustrated in FIG. 1, the transmitter 110 can service a large number of receivers in accordance with embodiments described herein.

Figure 2:
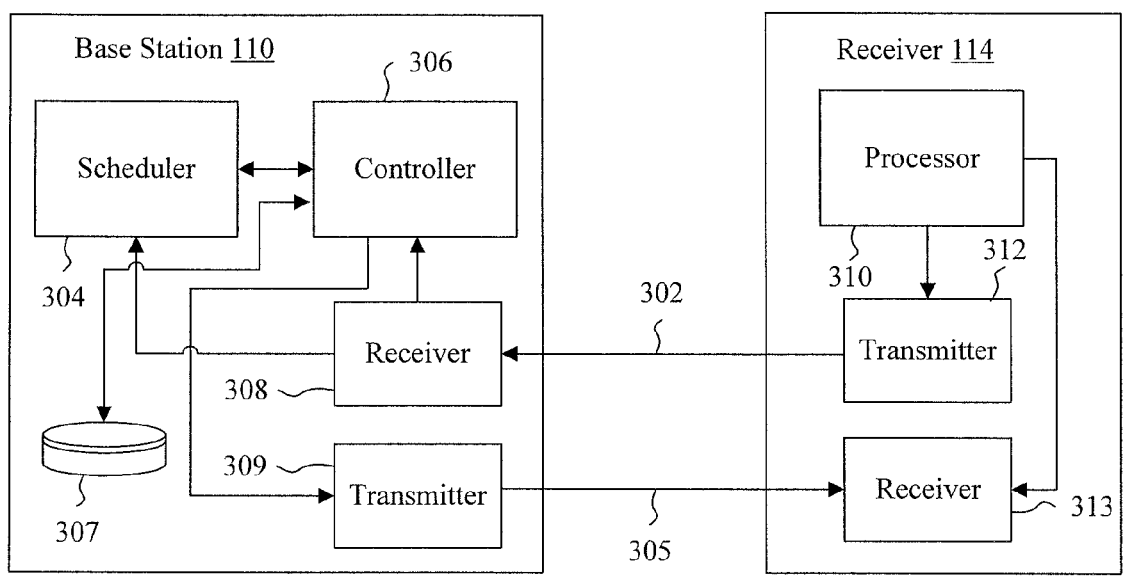
FIG. 2 is a high-level block/flow diagram of a base station system and a user/receiver system in accordance with an exemplary embodiment.

Referring to FIG. 2, with continuing reference to FIG. 1, exemplary implementations of a base station system 110 and a receiver or user system 114, which can be identical to the receiver system 116, are illustrated. The base station 110 can include a scheduler 304, a controller 306, a storage medium 307, a receiver 308 and a transmitter 309. In addition, the receiver system 114 can include a processor 310, a transmitter 312 and a receiver 313. The base station 110 and the receiver 114 can communicate through one or more uplink control channels 302, on which the receiver can employ a transmitter 312 to transmit control information to the receiver 308 at the base station 104. In turn, the base station 104 can employ the transmitter 309 to transmit data in accordance with the beamforming methods described herein along one or more downlink channels 305 to the receiver 313 in the receiver system 114. The transmitters 309, 312 and the receivers 308, 313 can each be implemented as respective arrays of antennas. Further, the base station system 110 and the receiver system 114 can include respective storage mediums on which programs of instructions can be stored for execution by the controller 306 and processor 310, respectively. The functions of the controller 306 of the system are described in more detail herein below with respect to method embodiments. For example, the methods 200 and/or 400 can be performed by the controller 306 and the transmitter 309. For example, the controller 306 can execute programs of instructions embodying any one or more of the steps of these methods that are stored on its respective storage medium 307.

It should further be understood that aspects of embodiments described herein may be entirely hardware, entirely software or including both hardware and software elements. In a preferred embodiment, the present invention is implemented in hardware and software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

1. Channel Model

The problem considered herein is multicasting from a single base station 110 with $N_T$ transmit antennas to multiple receivers, for example, receivers 114 and 116, each with $N_R$ receive antennas. Narrow band channels are considered and the received signal at the receiver k, for k=1, ..., K, is denoted by $$y_k = H_k x + z_k \quad (1)$$

where $y_k$ is the $N_R \times 1$ vector of the signal received by the user k, x is the $N_T \times 1$ vector of the transmitted signal from the base station, $z_k \sim \mathcal{CN}(0, I)$ is the $N_R \times 1$ noise vector at the receiver k and $H_k$ is a $N_R \times N_T$ channel matrix between the base station and the $k^{th}$ user. A block fading channel is used, where the channel remains constant for a period of transmitting one codeword (one time block) and changes from one time block to the other.

Beamforming at the base station is considered, where the transmit signal is x=wx for a constant beamforming vector w over a codeword transmission period through a stream of symbols x such that $E[xx^*]=1$. The goals of various embodiments is to optimize the beamforming vector at the transmitter under different objectives, i.e., maximizing the minimum rate of all users under a short-term beamforming constraint or a long-term beamforming constraint and with the assumption of perfect channel state information or quantized channel state information. With short-term beamforming, the beamforming vector may possibly change for each transmission block while, with long-term beamforming, the beamforming vector remains constant over the transmission of multiple such blocks.

In the following, the problem of maximizing the minimum rate of the users under a constant transmit power constraint is considered. The problem can alternatively be posed as minimizing the transmit power while satisfying a minimum rate requirement for all users. The short-term (ST) multicast beamforming with instantaneous and perfect channel state information at the base station is first considered herein below. Then the problem of long-term multicast beamforming with perfect channel knowledge is considered and addressed. For practical systems, the perfect channel state information is usually not available. In practice, the channel state information at the base station is obtained either by using reciprocity between the downlink and uplink channels in TDD (time division multiplexing) systems or it is obtained through feedback from the receivers to the base station in either TDD or FDD (frequency division multiplexing) systems. Different feedback strategies such as analog feedback, quantized covariance matrix feedback, or quantized channel feedback would have different effects in the performance of downlink transmission schemes. The optimization problems for both short-term or long-term multicasting beamforming can be reformulated to account for channel imperfections, as described in more detail herein below. It turns out that the resulting optimization problem for imperfect channel state information can be solved using techniques similar to those used to solve the problems of short-term or long-term beamforming with perfect channel state information.

2. Short Term Multicast Beamforming

The rate of the $k^{th}$ user can be written as $$R_k = \log \det(I + H_k w w^* H_k^*) \quad (2)$$

where H* denotes the hermitian of H. The short-term multicasting beamforming problem is formulated as $$\max_w \min_k \log\det(I + H_k w w^* H_k^*) \quad (3)$$

$$\text{s.t.} \quad w^* w \leq P \quad (4)$$

where P is the total power constraint. Without loss of generality, it can be assumed that P=1. Also, it is noted that the power constraint $w^*w \leq P$ has to be satisfied with equality, since otherwise $w_{opt}$ can be scaled up such that the power constraint is satisfied with equality and this increases the objective function and is therefore a contradiction. The problem can be alternatively presented as the maximization of the minimum received SNR of all users, i.e.

$$\mathcal{P}_1: \max_w \min_k w^* H_k^* H_k w \quad (5)$$

$$\text{s.t.} \quad w^* w \leq P \quad (6)$$

the solution to this optimization problem is equivalent (up to a scaling) to the solution to the following problem $$\mathcal{P}_2: \min_w w^* w \quad (7)$$

$$\text{s.t.} \quad \min_k w^* H_k^* H_k w \geq \alpha, \quad \forall 1 \leq k \leq K \quad (8)$$

Both formulations $\mathcal{P}_1$ and $\mathcal{P}_2$ of the ST (short term) multicast beamforming problem are quadratically constrained quadratic optimization programs (QCQP) which are nonconvex problems and their discrete versions are known to be NP-hard (non-deterministic polynomial-time hard).

2A. Suboptimal Greedy Solution

The lagrangian and the KKT conditions for $P_2$ are written as:

$$L(w, \lambda) = w^* w \sum_{k=1}^{K} \lambda_k (\alpha - w^* H_k^* H_k w) \quad (9)$$

$$\nabla_w L(w, \lambda) = 2w - 2\sum_{k=1}^{K} \lambda_k H_k^* H_k w = 0 \quad (10)$$

$$\lambda_k \geq 0, \quad \forall 1 \leq k \leq K \quad (11)$$

$$\lambda_k (\alpha - w^* H_k^* H_k w) = 0 \quad (12)$$

where $\lambda=[\lambda_1, \ldots, \lambda_k, \ldots, \lambda_K]$. Based on the optimality conditions (10) and (12), two observations that serve the basis for the greedy beamforming approach can be made.

Observation 1: The multicasting beamformer w is within the column span of the matrix $[H^*_1, \ldots, H^*_k, \ldots, H^*_K]$. The reason is that (10) can be written as $w=\sum_{k=1}^{K}\lambda_k H^*_k H_k w = \sum_{k=1}^{K}\lambda_k H^*_k a_k$, where $a_k = H_k w$ is a $N_R \times 1$ vector. Thus, $$w = \sum_{k=1}^{K} \lambda_k H_k^* a_k = \sum_{k=1}^{K} \sum_{r=1}^{N_R} \lambda_k a_{r,k} h_{r,k}^* \quad (13)$$

where $a_{r,k}$ is the $r^{th}$ element of the vector $a_k$ and $h^*_{r,k}$ is the $r^{th}$ column of the matrix $H^*_k$. This is clearly the linear combination of all columns of the matrices $H^*_k$ for $1 \leq k \leq K$.

Figure 3:
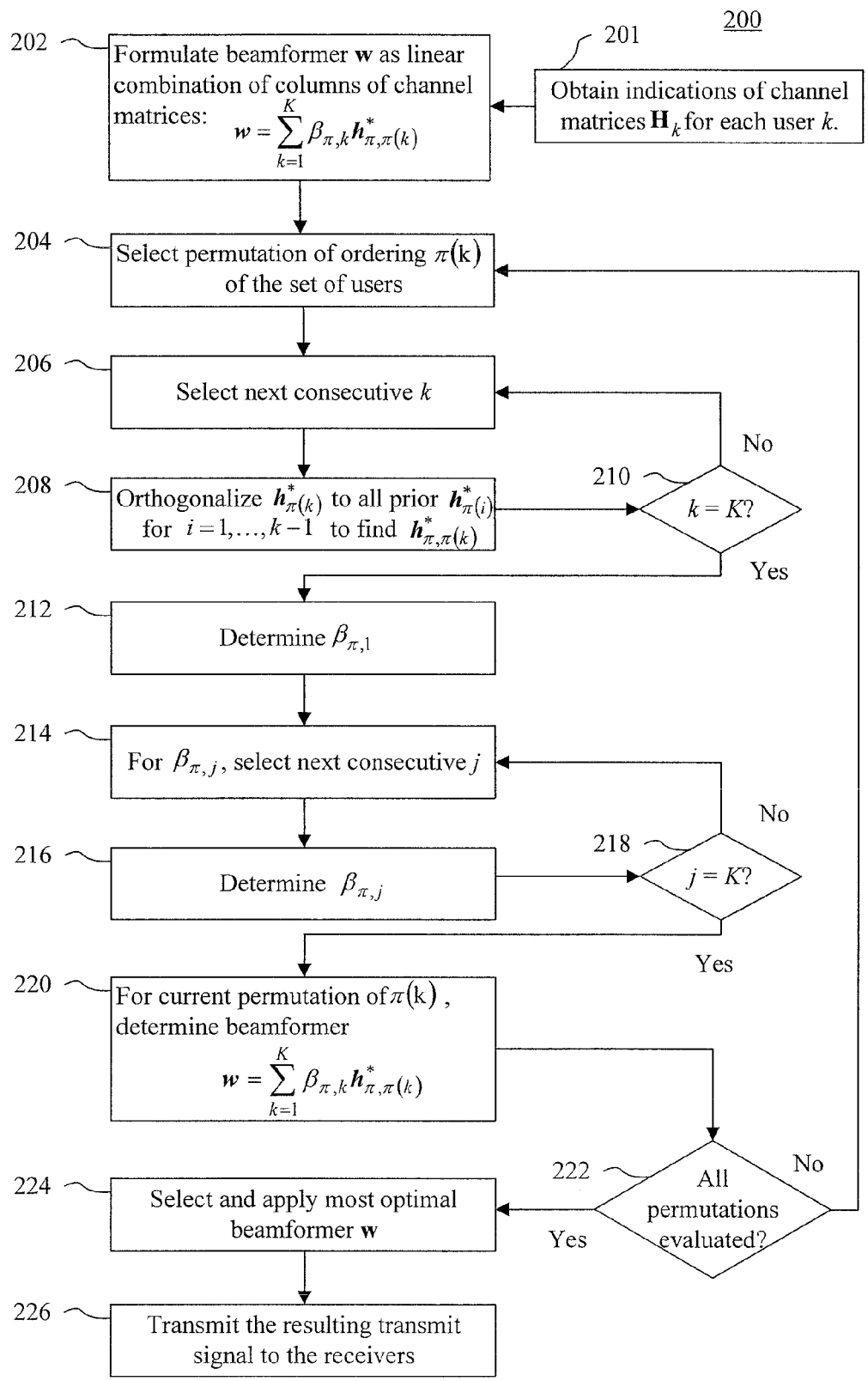
FIG. 3 is a high-level block/flow diagram of an embodiment of a method for determining a beamforming matrix.

Motivated by the above-described observation, a greedy approach is provided to solve problem $\mathcal{P}_2$. Referring now to FIG. 3, with continuing reference to FIGS. 1 and 2, an exemplary embodiment 200 of a method for determining a beamforming vector or precoder in accordance with the approach is illustrated. An exemplary algorithm that also follows this approach is provided herein below in Table 1.

TABLE 1

Algorithm 1: Suboptimal greedy algorithm for short term multicast precoder design.

Algorithm 1:
Input. Channel matrices $h_k$, $1 \leq k \leq K$ and $\alpha > 0$.
Output. A set of complex numbers $\beta_{\pi,k}$, and w.
1  for every ordering $\pi$ of $\{1, 2, \ldots, k\}$
2    for every $1 \leq k \leq K$, $$h_{\pi,\pi(k)} \leftarrow h_{\pi(k)} - \sum_{l=1}^{k-1} \frac{h_{\pi(k)} h_{\pi,\pi(l)}^*}{\|h_{\pi(k)} h_{\pi,\pi(l)}\|} h_{\pi,\pi(l)}$$

3    $\beta_{\pi,1} \leftarrow \sqrt{(\alpha)}\|h_{\pi,\pi(1)} h_{\pi(1)}^*\|^{-1}$
4    for every $2 \leq j \leq K$
       $A \leftarrow |h_{\pi,\pi(j)} h_{\pi(j)}^*|^2$,
       $B \leftarrow (\Sigma_{k=1}^{j-1} \beta_{\pi,k}^* h_{\pi,\pi(k)} h_{\pi(j)}^*) h_{\pi(j)} h_{\pi,\pi(j)}^*$,
       $C \leftarrow |h_{\pi(j)} \Sigma_{k=1}^{j-1} h_{\pi,\pi(k)}^* \beta_{\pi,k}|$
       if $C \geq \alpha$ then $\beta_{\pi,j} = 0$ else $$\beta_{\pi,j} = \frac{1}{A}\left(|B| + \sqrt{|B|^2 + A(\alpha - C)}\right) e^{-j\phi(B)}$$

where $\phi(B)$ is the phase of B.
       end if
     end for
5    $w_\pi = \Sigma_{k=1}^{K} \beta_{\pi,k} h_k^*$
6  end for
7  $w = \arg\min_{w_\pi} \|w_\pi\|$
8  $\hat{\pi} = \arg\min_{\pi} \|w_\pi\|$ The method 200 can begin at step 201, at which the controller 306 of the base station 110 can obtain indications of channel matrices $H_k$ for each user k. For example, as indicated above, the channel state information can be obtained by the controller 306 either by using reciprocity between the downlink and uplink channels in TDD systems or can be obtained through feedback from each of the K receivers (e.g., receiver 114 and 116) to the base station in either TDD or FDD systems. As also stated above, such feedback can include analog feedback, quantized covariance matrix feedback, or quantized channel feedback.

Here, it is assumed that $N_R=1$ for simplicity of discussion and also to permit ease of understanding of the method 200 and Algorithm 1. In this case, $h_k$ is explicitly written instead of $H_k$. Thus, for each user k, $h_k$ can be obtained by the base station at step 201 and can be input into Algorithm 1, as provided above. Based on the above-discussed observation that the beamforming vector or precoder is a linear combination of all columns of the matrices $H^*_k$ for $1 \leq k \leq K$, the optimal multicasting beamforming vector should be in the following form $$w = \sum_{k=1}^{K} \beta_k h_k^* \quad (14)$$

Thus, at step 202, the controller 306 of the base station 110 can formulate the beamformer w as a linear combination of columns of the channel matrices of the users. The following parts of the method are based on a second observation.

Observation 2: Given a permutation of the users, the optimal solution can be represented as a function of the orthogonalized channels of each user with respect to the channels of users preceding it in the permutation. This can be inferred from (12)

Suppose that M out of K values of $\lambda_k$ are non-zero and the rest are zero. Assume an ordering $\pi(k)$ of users where $\lambda_{\pi(k)} \neq 0$ for $1 \leq k \leq M$. For a given permutation $\pi$ and for all k from 1 to K, let $h^*_{\pi,\pi(k)}$ denote the vector obtained by successively orthogonalizing $h^*_{\pi(k)}$ to all prior $h^*_{\pi(i)}$ for $i=1, \ldots, k-1$. (14) can be rewritten as $$w = \sum_{k=1}^{K} \beta_{\pi,k} h_{\pi,\pi(k)}^* \quad (15)$$

It is noted that by using the KKT condition and the assumption that $\lambda_{\pi(k)} \neq 0$ for $1 \leq k \leq M$, the constraint $\alpha - w^* h^*_{\pi(k)} h_{\pi(k)} w \leq 0$ has to be satisfied with equality for indices $\pi(k)$, $1 \leq k \leq M$. By using (15) and orthogonal construction of $h^*_{\pi(k)}$ we have $$\alpha = \left(\sum_{k=1}^{K} \beta_{\pi,k}^* h_{\pi,\pi(k)}\right) h_{\pi(j)}^* h_{\pi(j)} \left(\sum_{l=1}^{K} h_{\pi,\pi(l)}^* \beta_{\pi,l}\right) \quad (16)$$

$$= \left(\sum_{k=1}^{j} \beta_{\pi,k}^* h_{\pi,\pi(k)}\right) h_{\pi(j)}^* h_{\pi(j)} \left(\sum_{l=1}^{j} h_{\pi,\pi(l)}^* \beta_{\pi,l}\right) \quad (17)$$

for $j=1, \ldots, M$. The expression (17) has the following interpretation that can be used to successively build the solution as will be shown below. Consider $j=1$, then $$\alpha = \beta_{\pi,1}^* h_{\pi,\pi(1)} h^*_{\pi(1)} h_{\pi(1)} h^*_{\pi,\pi(1)} \beta_{\pi,1} \quad (18)$$

in which $\beta_{\pi,1}$ can be found to satisfy this condition. Next, for $j=2$, $$\alpha = \beta_{\pi,1}^* h_{\pi,\pi(1)} h_{\pi(2)}^* h_{\pi(2)} h_{\pi,\pi(1)}^* \beta_{\pi,1} + \\ \beta_{\pi,2}^* h_{\pi,\pi(2)} h_{\pi(2)}^* h_{\pi(2)} h_{\pi,\pi(2)}^* \beta_{\pi,2} + 2\Re\{\beta_{\pi,1}^* h_{\pi,\pi(1)} h_{\pi(2)}^* h_{\pi(2)} h_{\pi,\pi(2)}^* \beta_{\pi,2}\} \quad (19)$$

in which $\beta_{\pi,2}$ can be found to satisfy this condition given that $\beta_{\pi,1}$ from the previous step is used. It is noted that the successive orthogonality of $h_{\pi,\pi(k)}$ with respect to k ensures that the conditions that are met previously still remain intact as we find the values for the next $\beta_{\pi,k}$.

Thus, to find the beamformer w, at step 202 of the method 200, the controller 306 of the base station can formulate the beamformer matrix w as $$w = \sum_{k=1}^{K} \beta_{\pi,k} h^*_{\pi,\pi(k)}.$$

The method can proceed to step 204, at which the controller 306 selects a given permutation of an ordering of users $\pi(k)$, as indicated above and as provided in line 1 of Algorithm 1. The function $\pi(k)$ for k=1, 2, . . . M outputs the index of the first user, second user, . . . , $k^{th}$ user after some ordering. For example, in one permutation $\pi$ user 114 in FIG. 1 is assigned to be the first user and user 116 is assigned to be the second user, while in different permutation $\pi$ user 114 in FIG. 1 is assigned to be the second user and user 116 is assigned to be the first user.

At step 206, the controller 306 of the base station 110 selects the next consecutive user k in the permutation selected at step 204 in the same iteration of the method 200. For example, in the first iteration of step 206 for a given permutation $\pi$, the base station selects k=1. In the next iteration, the base station selects k=2 in the given permutation, etc.

At step 208, the controller 306 of the base station 110 successively orthogonalizes $h^*_{\pi(k)}$ to all prior $h^*_{\pi(i)}$ for i=1, . . . , k−1 in the permutation with to the value of k selected at step 206 in the same iteration of the method 200 to determine $h^*_{\pi,\pi(k)}$. For example, as provided in line 2 of Algorithm 1, $h_{\pi,\pi(k)}$ is determined by calculating $$h_{\pi(k)} - \sum_{l=1}^{k-1} \frac{h_{\pi(k)} h^*_{\pi,\pi(l)}}{\|h_{\pi(k)} h_{\pi,\pi(l)}\|} h_{\pi,\pi(l)}.$$

Further, $h^*_{\pi,\pi(k)}$ is determined by taking the Hermitian of the result. At step 210, the controller 306 can determine whether k=K. If not, then steps 206 and 208 can be repeated. If so, then the method can proceed to step 212. It should be noted that although the method successively orthogonalizes the channel matrices, variations to the method can be made. For example, as opposed to orthogonalizing the channel matrices from k=1 to k=K, the orthogonalizing can be conducted in preceding order, from k=K to k=1. Similar modifications to the methods described herein can be made in other various steps and are within the scope of the present principles.

At step 213, the controller 306 of the base station 110 can determine $\beta_{\beta,1}$. For example, as provided in line 3 of Algorithm 1, the controller 306 can determine $\beta_{\beta,1}$ by calculating $\sqrt{(\alpha)} \|h_{\pi,\pi(1)} h^*_{\pi(1)}\|^{-1}$.

At step 214, the controller 306 can select the next consecutive j for $\beta_{\pi,j}$. In addition, the controller 306 can determine $\beta_{\pi,j}$ for this selected j at step 216. For example, as provided in line 4 in Algorithm 1, for a given $\beta_{\pi,j}$, the controller 306 can determine A, B and C, where A is $|h_{\pi,\pi(j)} h^*_{\pi(j)}|^2$, B is $(\Sigma_{k=1}^{j-1} \beta^*_{\pi,k} h_{\pi,\pi(k)}) h^*_{\pi(j)} h_{\pi(j)}$ and C is $|_{\pi(j)} \Sigma_{k=1}^{j-1} h^*_{\pi,\pi(k)} \beta_{\pi,k}|$. Further, if $C \geq \alpha$, then the controller 306 determines $\beta_{\pi,j}$ to be zero. Otherwise, the controller 306 determines $\beta_{\pi,j}$ by calculating $$\beta_{\pi,j} = \frac{1}{A} \left( |B| + \sqrt{|B|^2 + A(\alpha - C)} \right) e^{-j\varphi(B)},$$

where $\phi(B)$ is the phase of B. Here, $\beta_{\pi,j}$ can be iteratively determined for each value of j, where $2 \leq j \leq K$. Thus, the method can proceed to step 218, at which the controller 306 determines whether $\beta_{\pi,K}$ has been determined. If not, then the method can proceed to step 214 at which the controller 306 selects the next consecutive j and $\beta_{\pi,j}$ for this selected j is determined at step 216. Otherwise, the method can proceed to step 220. It should be noted that the value for $\beta_{\pi,k}$ that satisfies condition (17) might not be unique and it should be chosen to minimize the noun of the multicasting beamformer w at the final step. With the aim of minimizing the norm of w, at each performance of step 216, and also step 212, the controller 306 can find and select the value of $\beta_{\pi,k}$ that minimizes the partial norm of w, which in turn is defined as $$\|w\|_{1 \to k}^2 = \left\| \sum_{j=1}^{k} \beta_{\pi,j} h^*_{\pi,\pi(j)} \right\|_2^2 \tag{20}$$

At step 220, the controller 306 can determine the beamformer $w_\pi$ for the permutation of $\pi(k)$ selected at step 204 in the current iteration of the method 200 by calculating $$w_k = \sum_{k=1}^{K} \beta_{\pi,k} h^*_{\pi,\pi(k)}.$$

At step 222, the controller 306 can determine whether all possible permutations of $\pi(k)$ have been evaluated. If not, then the method can proceed to step 204 and a permutation of $\pi(k)$ that has not been evaluated can be selected and steps 206-222 can be repeated. If all possible permutations of $\pi(k)$ have been evaluated, then the method can proceed to step 224, at which the controller 306 can select and apply the most optimal beamformer w. For example, after obtaining a beamformer w for each possible permutation of $\pi(k)$, the controller 306 can determine which beamformer or precoder w results in a minimum w*w such that $$\min_k w^* H_k^* H_k w \geq \alpha,$$

as described above with regard to problem $\mathcal{P}_2$. Alternatively, after obtaining a beamformer w for each possible permutation of $\pi(k)$, the base station can determine which beamformer or precoder w results in a maximum value of the minimum received SNR $w^* H^*_k H_k w$ under the power constraint $w^* w \leq P$ as described above with regard to problem $\mathcal{P}_1$. In accordance with another example, the final beamforming vector is obtained as the beamforming vector that has the minimum norm over all permutations and the corresponding permutation $\hat{\pi}$ is obtained similarly as the permutation for which the beamforming vector has the minimum norm, as illustrated in lines 7-8 of Algorithm 1. Further, the controller 306 can apply the most optimal beamformer w to the multicast data stream symbols x to generate a transmit signal x=wx for receipt by receivers 114 and 116.

At step 226, the controller 306 can direct the transmitter 309 to transmit the resulting transmit signal to the receivers 114 and 116. Thereafter, the method can be repeated for newly obtained channel matrices $H_k$ for each user k.

The greedy approach described above attempts to minimize the norm at each step although the optimal solution might not necessarily abide this structure. For any given permutation function $\pi(k)$, if this greedy approach is applied for all values of k for k=1, ..., K, the base station 110 can always find a vector w such that all the constraints $\alpha - w^* h^*_{\pi(k)} h_{\pi(k)} w \leq 0$ are at least satisfied with equality. One might notice that in some cases if at step j, the condition $$\left(\sum_{k=1}^{j-1} \beta^*_{\pi,k} h_{\pi,\pi(k)}\right) h^*_{\pi(j)} h_{\pi(j)} \left(\sum_{l=1}^{j-1} h^*_{\pi,\pi(l)} \beta_{\pi,l}\right) \geq \alpha \quad (21)$$

is satisfied, then the $j^{th}$ constraint $$\left(\sum_{k=1}^{j} \beta^*_{\pi,k} h_{\pi,\pi(k)}\right) h^*_{\pi(j)} h_{\pi(j)} \left(\sum_{l=1}^{j} h^*_{\pi,\pi(l)} \beta_{\pi,l}\right) \geq \alpha \quad (22)$$

automatically holds, even $\beta_{\pi,k}=0$. This property permits the successive evaluation of j up to K, as provided in Algorithm 1 and in the method 200. In order to find the best solution, this greedy procedure is repeated for all possible permutations $\pi$. However, it is noted that up to step M, all derivations are identical for two permutations $\pi_1$ and $\pi_2$ that have the same prefix, i.e., $\pi_1(k)=\pi_2(k)$, $1 \leq k \leq M$ for some M.

For small to moderate number of users K, an exhaustive search of all possible permutations usually leads to a solution very close to the optimal solution. The distance to the optimal solution is measured by the duality gap, as discussed in the next section. However, for large numbers of users where exhaustive search is not tractable, one can consider a smaller number of permutations that are randomly generated for which performing the proposed greedy method is computationally tractable.

2B. Optimal Solution for the Real Channels

In some cases it is possible to find the optimal solution to the problem $\mathcal{P}_2$. Consider the case where it is possible to find a multicasting beamforming vector that satisfies all the constraints with equality. By using the linear expansion of the w in the form (14) we have $$w^* h^*_j h_j w = \alpha, \; \forall j, 1 \leq j \leq K \quad (23)$$

$$\sum_{k=1}^{K} \beta_k h_k h^*_j h_j \left(\sum_{k=1}^{K} \beta_k h_k\right) = \alpha \quad (24)$$

$$\left\|\sum_{k=1}^{K} \beta_k h_k h^*_j\right\|^2 = \alpha \quad (25)$$

$$\sum_{k=1}^{K} \beta_k h_k h^*_j = \sqrt{\alpha} \, e^{i\theta_j} \quad (26)$$

for some phases $\theta_j$, $1 \leq j \leq K$ where $i=\sqrt{-1}$. The final result shows that for a given set of phases $\theta_j$, $1 \leq j \leq K$, the set of equations in (26) is linear with respect to the column vector $\underline{\beta}=[\beta_1, \ldots, \beta_K]^T$ and can be easily solved. We have $$F\underline{\beta} = \sqrt{\alpha} \begin{bmatrix} e^{i\theta_1} \\ e^{i\theta_2} \\ \vdots \\ e^{i\theta_K} \end{bmatrix} \text{ where } \quad (27)$$

$$F = \begin{bmatrix} h_1 h^*_1 & h_1 h^*_2 & \cdots & h_1 h^*_K \\ h_2 h^*_1 & h_2 h^*_2 & \cdots & h_2 h^*_K \\ \vdots & & & \vdots \\ h_K h^*_1 & h_K h^*_2 & \cdots & h_K h^*_K \end{bmatrix} \quad (28)$$

If the channel is real, then the only possible phases would be 0 and $\pi$ and we have $$F\underline{\beta} = \sqrt{\alpha} 1_\tau \quad (29)$$

where $1_\tau$ is one of $2^K$ possible K×1 vectors in the form $[\pm 1 \pm 1 \ldots \pm 1]^T$, and $\tau$ indicates the sign pattern. Using the definition of F we can write (14) as $w=F^*\underline{\beta}$. The norm of w can then be written as $$\|w\|^2 = w^* w = \underline{\beta}^* F F^* \underline{\beta} \quad (30)$$

and for a given sign pattern $\tau$, the minimum norm of w is obtained by $$\|w\|^2_{min,\tau} = \alpha 1_\tau^{F^+*} F F^* F^+ 1_\tau \quad (31)$$

where $F^+$ is the pseudo-inverse of F. It is noted that, here, we are only considering the case that the set of linear equations (29) are not overdetermined and hence the pseudoinverse $F^+$ exists. To obtain the optimal solution all $2^K$ sign patterns $\tau$ should be considered and the following should be determined $$\|w\|^2_{min} = \min_\tau \|w\|^2_{min,\tau}. \quad (32)$$

Finding the optimal solution for real channels is still NP-hard with respect to the number of users as expected. However, in most practical scenarios, a base station serves small or moderate numbers of users. Thus, finding the optimal solution should be computationally feasible. With complex channels, even for a fixed number of users, the non-convexity of the problem makes it computationally challenging to find the optimal or close to optimal solution.

If the channel is not real, then the phase values $\theta_j$, $1 \leq j \leq K$ are not within a finite set, and hence the approach of solving a set of linear equations cannot be used. In fact, from the procedure in Algorithm 1 it can be interpreted that the values of $\theta_j$'s are found successively by a greedy solution where at each step the procedure attempts to minimize the partial norm of the beamforming vector as defined in (20).

2C. Dual Problem and Bound

The bound on the performance of the beamforming method can be derived by using the dual problem. In order to find the dual problem, the optimization problem $P_1$ can be re-written as follows $\mathcal{P}_3$:

$$\min_w -\alpha \quad (33)$$

$$s.t. \; \alpha - w^* H^*_k H_k w \leq 0, \forall k, 1 \leq k \leq K \quad (34)$$

$$w^* w \leq 1 \quad (35)$$

The lagrangian can be written as $$L_D(\alpha, w, \lambda) = -\alpha + \sum_{k=1}^{K} \lambda_k (\alpha - H_k^* H_k w) \quad (36)$$

where $\lambda=[\lambda_1, \lambda_2, \ldots, \lambda_K]$ and the lagrangian is written in the region $\overline{D}=\{w:w^*w\leq 1\}$. Thus, $$g(\lambda) = \inf_{D, \alpha \geq 0} L_D(\alpha, w, \lambda) \quad (37)$$

$$= \begin{cases} -\infty & \sum_{k=1}^{K} \lambda_k < 1 \\ \inf_D -w^*\left(\sum_{k=1}^{K} \lambda_k H_k^* H_k\right) w & \sum_{k=1}^{K} \lambda_k \geq 1 \end{cases} \quad (38)$$

$$= \begin{cases} -\infty & \sum_{k=1}^{K} \lambda_k < 1 \\ -\sigma_{max}^2\left(\sum_{k=1}^{K} \lambda_k H_k^* H_k\right) & \sum_{k=1}^{K} \lambda_k \geq 1 \end{cases} \quad (39)$$

The optimal point of the dual problem gives a lower bound to the primal problem in this case. As such, a lower bound to the objective function $-\alpha$ is given by $$\sup_\lambda g(\lambda) = \sup_{\Sigma_{k=1}^{K} \lambda_k \geq 1} -\sigma_{max}^2\left(\sum_{k=1}^{K} \lambda_k H_k^* H_k\right) \quad (40)$$

$$= \inf_{\Sigma_{k=1}^{K} \lambda_k \geq 1} \sigma_{max}^2\left(\sum_{k=1}^{K} \lambda_k H_k^* H_k\right) \quad (41)$$

where $\sigma_{max}^2(A)$ denotes the largest singular value of the matrix A. It follows that $$\alpha_{max} \leq \inf_{\Sigma_{k=1}^{K} \lambda_k \geq 1} \sigma_{max}^2\left(\sum_{k=1}^{K} \lambda_k H_k^* H_k\right) \quad (42)$$

The problem of minimizing the largest eigenvalue of a linear combination of matrices can be efficiently solved by writing it as a Semi-Definite Programming (SDP) as follows $$\mathcal{P}_4: \min_\lambda \alpha \quad (43)$$

$$\text{s.t.} \left(\sum_{k=1}^{K} \lambda_k H_k^* H_k\right) \leq \alpha I \quad (44)$$

$$\sum_{k=1}^{K} \lambda_k \geq 1 \quad (45)$$

where $B \preceq A$ is a linear matrix inequality (LMI) indicating that A−B is a non-negative definite matrix. The lower bound obtained with the help of the dual formulation can be employed to evaluate the efficiency of the beamforming method.

3. Long-Term Multicast Beamforming

For the long-term multicast beamforming case, it is assumed that the user, for example, receivers 114 and 116, acquires the channel state information over a longer period of time and is also able to encode over multiple fading blocks with the same statistics. In this case, the instantaneous channel knowledge is not required and access to the channel statistic for the past several blocks is generally sufficient, depending on the coherence time of the channel. Since the coding is done over multiple blocks, the rate of the $k^{th}$ user can be written as $$R_k = E_{\mathcal{H}_k} \lfloor \log \det(I + H_k w w^* H_k^*) \rfloor \quad (46)$$

where the expectation is taken over $\mathcal{H}_k$, the set of expected channels for the user k. The long-term multicast beamforming problem is formulated as $$\mathcal{P}_5: \max_w \min_k E_{\mathcal{H}_k} \lfloor \log\det(I + H_k w w^* H_k^*) \rfloor \quad (47)$$

$$\text{s.t.} \quad w^* w \leq P \quad (48)$$

where P is the total power constraint. Unlike the short-term beamforming problem, this problem cannot be written in the form of a quadratic programming because of the expectation operation. Also, it is noted that the above-formulation of the problem is different from the problem of maximizing the minimum of the average SNR among all users.

3A. Suboptimal Gradient Ascent Solution

One advantage of the algorithm in Table 1 that solves the short-term multicast beamforming problem is that there is no need for an iterative approach in which solutions are based on successive estimations of a value, as in prior works. Such iterative approaches often require fine adjustments to the solution parameters to obtain a fast convergence rate and to avoid divergence. However, the algorithm in Table 1, above, exploits the fact that the matrix $H^*_k H_k$ for all users is unit rank. This algorithm is not directly applicable to either of the formulations of the long-term beamforming problem which use the average rate or average SNR as the objective function.

The optimization problem (47) is non-convex. Here, we seek a solution based on the gradient ascent algorithm. The convergence rate and the final result of the gradient ascent algorithm highly depends on the starting point and its step size. One can uniformly choose multiple starting points in order to find a better result.

The gradient of the objective function $$J = \min_k E_{\mathcal{H}_k} \lfloor \log\det(I + H_k w w^* H_k^*) \rfloor \quad (49)$$

versus the beamforming vector w is given by $$\nabla_w J = 2 E_{\mathcal{H}_{j(w)}} [(1 + w^* H_{j(w)}^* H_{j(w)} w)^{-1} H_{j(w)} w] \quad (50)$$

where $$j(w) = \arg\min_k E_{\mathcal{H}_k} \lfloor \log\det(I + H_k w w^* H_k^*) \rfloor \quad (51)$$

Please note that the above-derivation of the derivative assumes that the objective function J is well behaved with respect to j(w), i.e., for any w there exists a neighborhood around w such that $j(w+\delta(w))=j(w)$ for $\|\delta(w)\|<\delta$ for some small positive real number $\delta$.

The gradient ascent algorithm is then written as $$w(t+1) = w(t) + \mu \nabla_{w(t)} J \quad (52)$$
$$= \left(I + 2\mu E_{\mathcal{H}_{j(w)}}\left[\frac{H_{j(w)}}{1+(w^*H^*_{j(w)}H_{j(w)}w)}\right]\right)w(t)$$

$$w(t+1) = w(t+1)/\|w(t+1)\|_2 \quad (53)$$

where w(t+1) is the updated beamforming vector at time t+1, w(t) is the existing beamforming vector at time t, $\nabla_{w(t)} J$ is the gradient of the objective function calculated at time t and $\mu$ is the step size of the algorithm.

The optimization algorithm is summarized in Algorithm 2 below in Table 2.

TABLE 2

Gradient ascent-based algorithm for optimal long-term multicast precoder design

Algorithm 2:
Input. Channel matrices $H_k$, $1 \leq k \leq K$, and $\mu$, $\epsilon > 0$
Output. Precoding vector w of unity norm.

Figure 4:
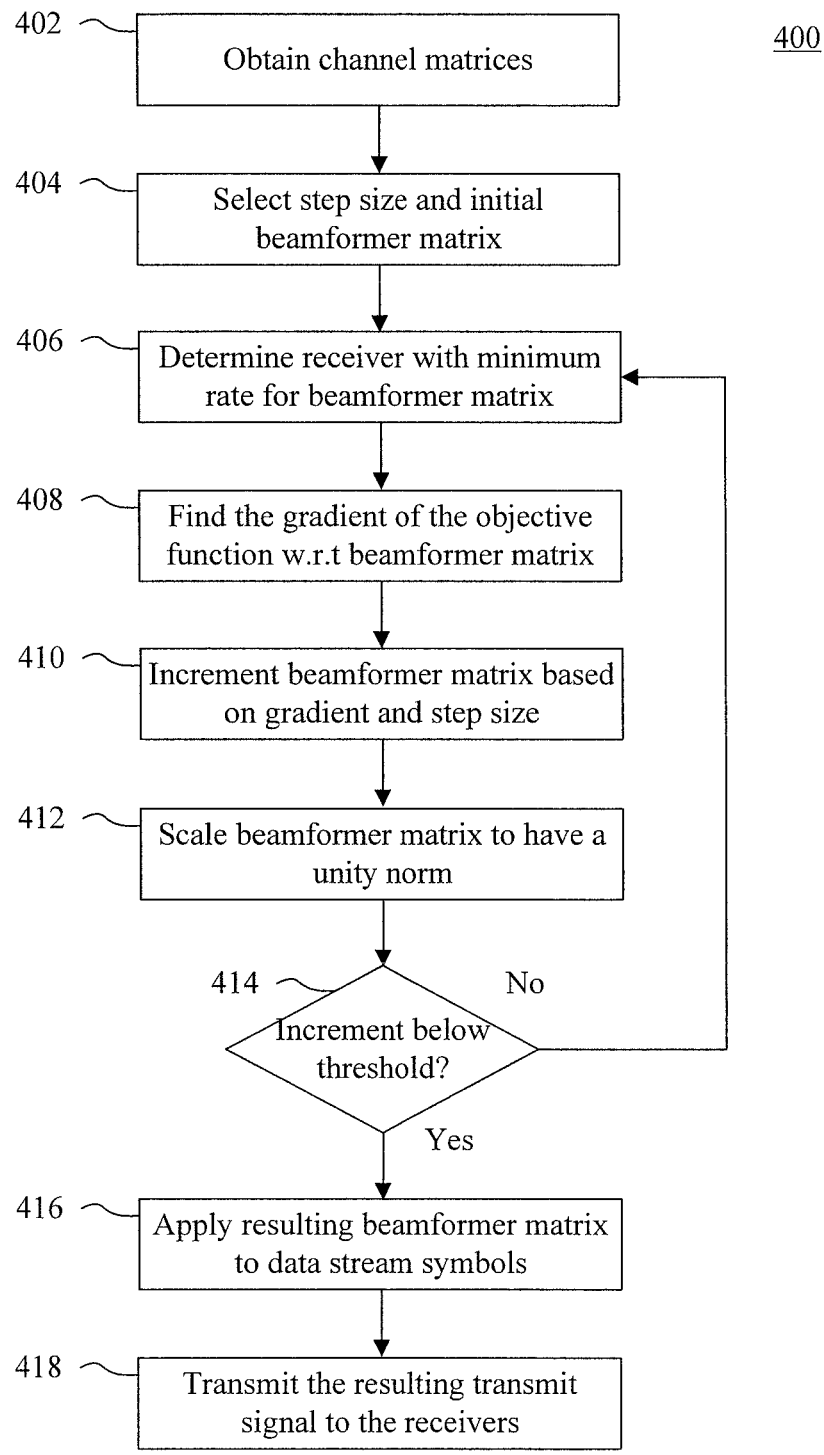
FIG. 4 is a high-level block/flow diagram of an embodiment of an alternative method for determining a beamforming matrix.

1 repeat $\quad j \leftarrow \arg\min_k E_{H_k}\lfloor \log\det(I + H_k w w^* H^*_k)\rfloor$ $\quad \Delta w \leftarrow 2E_{H_j}[(1 + w^* H^*_j H_j w)^{-1} H_j w]$ $\quad w \leftarrow w + \mu \Delta w$ $\quad w \leftarrow \dfrac{w}{\|w\|_2}$ until $\|\mu \Delta w\|_2 < \epsilon$ With reference now to FIG. 4, with continuing reference to FIGS. 1-3, a method 400 for determining a beamforming vector or precoder in accordance with a long-term multicast beamforming scheme is illustrated. Algorithm 2 of Table 2 is an exemplary implementation of the method 400. The method 400 can begin at step 402, at which the controller 306 of the base station 110 can obtain a set of channel matrices $H_k$ for each user k it expects to service. For example, as noted above with respect to step 201 of the method 200, the controller 306 can obtain the channel state information by using reciprocity between the downlink and uplink channels or can be obtained from feedback received from each of the K receivers at the base station, such as analog feedback, quantized covariance matrix feedback or quantized channel feedback. However, here, as indicated above, the controller 306 presumes that the channel state information obtained is valid for several time blocks, depending on the coherence time of the channel.

At step 404, the controller 306 can select a step size $\mu$ and an initial beamformer matrix w. Here, the initial beamformer matrix can be the beamformer matrix applied in a preceding time block. For example, as indicated above, to determine a beamforming matrix w(t+1), w(t) can be employed as the initial beamformer matrix in a gradient ascent procedure. In addition, as also indicated above, a plurality of different initial beamformer matrices can be selected to find a better result. The plurality of initial beamformer matrices can be obtained by varying the beamformer matrix applied in a preceding time block or by randomly selecting beamformer matrices. Thus, the controller 306 can perform the method 400 for different initial beamformer matrices simultaneously until convergence for at least one of the starting points is reached and picks the beamformer which results in the maximum of the objective function in (49).

At step 406, the controller 306 can determine which receiver has a lowest reception rate among reception rates of each of a plurality of receivers that the base station 110 services for the initial beamformer matrix. For example, in accordance with the objective function (49), the controller 306 can determine the receiver j with the lowest reception rate by calculating $\arg\min_k E_{\mathcal{H}_k} \emptyset \log \det(I+H_k ww^*H^*_k)$, as indicated in Algorithm 2. As stated above, the expectation is taken over $\mathcal{H}_k$, the set of expected channels for the user k for multiple time blocks.

At step 408, the controller 306 can find the gradient of the objective function with respect to the initial beamformer matrix for the user with the minimum rate. For example, as indicated in Algorithm 2, the controller 306 can determine the gradient of the objective function (49) by calculating 2 $E_{\mathcal{H}_j}[(1+w^*H^*_j H_j w)^{-1} H_j w]$. For consistency purposes, this gradient is denoted here as $\Delta w$.

At step 410, the controller 306 can increment the initial beamformer matrix w based on the gradient $\Delta w$ and the selected step size $\mu$. For example, as indicated in Algorithm 2 in Table 2, the beamforming matrix w can be incremented by $\mu \Delta w$.

At step 412, the controller 306 can scale the beamformer matrix to have a unity norm. For example, as provided in Algorithm 2 in Table 2 above, the beamformer matrix can be scaled by $$\frac{1}{\|w\|_2}.$$

At step 414, the controller 306 can determine whether the increment falls below a threshold. For example, as indicated in Algorithm 2 of Table 2, the controller 306 can determine whether the norm of the increment, $\|\mu \Delta w\|_2$, falls below a threshold $\epsilon$. If not, then the method can proceed to step 406, where the controller determines the user or the receiver that has the minimum rate with the resulting beamformer matrix obtained at step 412. Thereafter, the method proceeds to step 408 with this resulting beamformer matrix as the "initial" beamformer matrix described above. If the increment (or its norm) falls below the threshold, then convergence has been reached and the method can proceed to step 416, at which the controller 306 applies the resulting beamformer matrix obtained at the most recent iteration of step 412 to data symbols for transmission to the receivers. For example, the controller 306 can apply the resulting beamformer w to the multicast data stream symbols x to generate a transmit signal x=wx for receipt by receivers 114 and 116.

At step 418, the controller 306 can direct the transmitter 309 to transmit the resulting transmit signal to the receivers 114 and 116. Thereafter, the method can be repeated for newly obtained channel matrices $H_k$ for each user k.

3B. Dual Problem and Bound

In order to find the dual for the long-term beamforming problem, the optimization problem $\mathcal{P}_5$ can be rewritten as follows $$\min_w -\alpha \quad (54)$$

$$s.t. \ \alpha - E_{\mathcal{H}_k} \lfloor \log \det(I+H_k ww^*H^*_k)\rfloor \leq 0, \ \forall k, \ 1 \leq k \leq K \quad (55)$$

$$w^*w \leq 1 \quad (56)$$

The lagrangian can be written as $$L_D(\alpha, w, \underline{\lambda}) = -\alpha + \sum_{k=1}^{K} \lambda_k (\alpha - E_{\mathcal{H}_k}[\log\det(I + H_k ww^* H_k^*)]) \quad (57)$$

where $\underline{\lambda} = [\lambda_1, \lambda_2, \ldots, \lambda_K]$ and the lagrangian is written in the region $\overline{D} = \{w : w^* w \leq 1\}$. We have $$g(\underline{\lambda}) = \inf_{\overline{D}, \alpha \geq 0} L_D(\alpha, w, \underline{\lambda}) \quad (58)$$

$$= \begin{cases} -\infty, & \sum_{k=1}^{K} \lambda_k < 1 \\ \inf_{\overline{D}} -\left(\sum_{k=1}^{K} \lambda_k E_{\mathcal{H}_k}[\log\det(I + H_k ww^* H_k^*)]\right) & \sum_{k=1}^{K} \lambda_k \geq 1 \end{cases} \quad (59)$$

Unfortunately, $g(\underline{\lambda})$ cannot be found, as the computation involves solving a non-convex optimization problem. However, it is noted that the optimal point of the dual problem gives a lower bound to our primal problem and it takes the following form $$\alpha_{max} \leq \inf_{\underline{\lambda} : \sum_{k=1}^{K} \lambda_k \geq 1} \sup_{\overline{D}} \sum_{k=1}^{K} \lambda_k E_{\mathcal{H}_k}[\log\det(I + H_k ww^* H_k^*)] \quad (60)$$

Because the infimum of the supremum is considered, it is possible to replace the objective function $E_{\mathcal{H}_k}[\log\det(I + H_k ww^* H_k^*)]$ with its upper bound, e.g., based on the Jensen's inequality, and find an alternative upper bound as $$\alpha_{max} \leq \inf_{\underline{\lambda} : \sum_{k=1}^{K} \lambda_k \geq 1} \sup_{\overline{D}} \left[\log\det\left(I + w^* \left(\sum_{k=1}^{K} \lambda_k E_{\mathcal{H}_k} H_k^* H_k\right) w\right)\right] \quad (61)$$

Another alternative is to use the relaxation of the inner optimization problem in (62) and find the alternative upper bound as $$\alpha_{max} \leq \inf_{\underline{\lambda} : \sum_{k=1}^{K} \lambda_k \geq 1} \sup_{\overline{D}} \sum_{k=1}^{K} \lambda_k E_{\mathcal{H}_k}\left[\log\det\left(I + H_k \Sigma H_k^*\right)\right] \quad (62)$$

where $\Sigma$ is the transmit covariance matrix but we relax the condition that it has to be rank 1. The inner optimization problem is now convex and can be solved. By definition of the duality, the outer optimization problem is also convex and can be solved. However, the combination of these two optimization problems for which the closed form expression is not available makes the calculation of this bound computationally challenging. Nonetheless, if the dimension of the matrix $H_k$ is not too large, this latter bound would usually provide a tighter bound than the former bound derived based on the Jensen's inequality.

4. Imperfect Channel State Information

In practice, the channel state information at the base station is obtained either by using the reciprocity between the downlink and uplink channels in TDD systems or it is obtained by feedback from the receivers to the base station. Different feedback strategies such as analog feedback, quantized covariance matrix feedback or quantized channel feedback would have different effects in the performance of the downlink transmission schemes. If a quantized covariance feedback is used, the optimization problem $\mathcal{P}_1$ or $\mathcal{P}_2$ for the short-term beamforming will be used where $H^*_k H_k$ is replaced with $\Theta_k = H^*_k \Sigma_k^{-1} H_k$. Here, $\Sigma_k$ is the covariance of the noise at the receiver which can account for the possible noise correlation at the receiver. For example, the short-term beamforming problem $P_1$ is modified as $$\max_w \min_k w^* \Theta_k w \quad (63)$$

$$\text{s.t.} \quad w^* w \leq P \quad (64)$$

and the long-term beamforming problem $P_5$ is written as $$\max_w \min_k E_{\mathcal{H}_k}[\log(1 + w^* \Theta_k w)] \quad (65)$$

$$\text{s.t.} \quad w^* w \leq P \quad (66)$$

The same modifications to the other formulations employed in methods 200 and 400 can be made to enable the consideration of the covariances of noise for the receivers in the determination of an appropriate beamformer or precoder matrix in the methods.

In some cases the covariance matrix is estimated over a longer period of time and is reported less frequently. A long-term expectation of the covariance matrix represents the average statistic of the channel. In such scenarios, an alternative optimization problem $$\max_w \min_k w^* \overline{\Theta}_k w \quad (67)$$

$$\text{s.t.} \quad w^* w \leq P \quad (68)$$

can be solved where $\overline{\Theta}_k = E_{\mathcal{H}_k}[H^*_k \Sigma_k^{-1} H_k]$ is calculated on a long-term basis. It can be shown that the solution to this optimization problem gives only a lower bound to the original long-term optimization problem (65).

In most practical scenarios, the feedback of either the actual channel matrix $H_k$ or its covariance matrix $\Theta_k$ is not feasible due to the rate constraint in the feedback link. Therefore, a quantized version of the channel state, e.g., based on a codebook, is fed back to the base station. In such a scenario, the uncertainty in the feedback should be accounted for and the optimization problem should be modified accordingly. Let $C = \{C_1, \ldots, C_M\}$ denote the codebook of size M for quantizing the channel matrix $H_k$. Here, it is assumed that the codebook not only quantizes the channel direction but also the gain of the channel. In practice, the codebook is usually used to quantize the channel direction for the normalized channel matrix and the gain of the channel is fed back as a quanized real number, namely CQI (channel quality index) which also accounts for the actual modulation and coding used. By using the codebook C, the receivers 114, 116 quantize the channel $H_k$ to $C_m$ and feedback the index m to the base station 110 if $$d(H_k, C_m) \leq d(H_k, C_j) \forall j, \; 1 \leq j \leq M \quad (69)$$

for some distance metric d(.,.), e.g., d(a,b)=‖a*b‖². Accordingly, the receiver feeds back the codebook index corresponding to the matrix in the codebook that is closest to $H_k$ and is within a distance d from that matrix. Here, at most only $\log_2(M)$ bits are used to feedback the channel matrix $H_k$ to the base station 110. The base station 110, in turn, receives the codebook indexes from each of the receivers 114, 116 it services, and solves an optimization problem that is reformulated to account for the uncertainty in the actual value of $H_k$. The corresponding optimization problem for the short-term beamforming would be posed as $$\max_w \min_k \min_{H_k \in \mathcal{D}_k} w^* H_k^* H_k w \quad (70)$$

$$\text{s.t.} \quad w^* w \leq P \quad (71)$$

where $$\mathcal{D}_k = \{H : d(H, C_m) < d(H, C_j) \forall m, 1 \leq j \leq M, j \neq m\} \quad (72)$$

Thus, the controller 306 of the base station 110 considers all of the matrices H that are closer to $C_m$, in terms of the distance d(.,.), than to any other matrix $C_m$ in the codebook C, i.e., the matrices in the set $\mathcal{D}_k$, to solve the optimization problem (70), (71). The long-term beamforming problem would be similarly solved by the controller 306 of the base station 110. Here, the long-term beamforming problem would also be posed as $$\max_w \min_k E_{\mathcal{H}_k} E_{\mathcal{D}_k} [\log(1 + w^* H_k^* H_k w)] \quad (73)$$

$$\text{s.t.} \quad w^* w \leq P \quad (74)$$

Taking the double expectation on $H_k$ over regions $\mathcal{H}_k$ and $\mathcal{D}_k$ is under assumption that the quantization error is independent of the channel variation.

It is also noted that the optimization problem posed in this section is very similar to one of the original optimization problems for short-term and long-term beamforming with the difference being the minimization or expectation is taken over a different set. Therefore, the discussions in the previous sections on the algorithms and methods to solve these problems or the bounds would directly apply here. Specifically, the short term and long term optimization problems described above can be substituted with (70)-(72) and (73)-(74), respectively, and the controller 306 of the base station 110 can essentially perform the methods described above using (70)-(72) or (73)-(74) as the optimization problems.

5. Optimal Solution for Hidden Convexity in Short Term Multicast Beamforming Problem As indicated above, the determination of the beamformer matrix can be made in a substantially more efficient manner if certain particular conditions are met due to a hidden convexity in the short term multicast optimization problem. The approach taken here is to show that under certain conditions on the channel matrices the duality gap is in fact zero. The result of the section discussing the dual problem and bound for the short term multicast beamforming problem is used in determining the bound on $\sigma_{max}$. As described in more detail herein below, the following theorem has been found to be valid:

Theorem 1: If the solution to the optimization problem $\mathcal{P}_4$ is such that the maximum eigenvalue (denoted by $\alpha_{opt}$) and eigenvector (denoted by $w_{opt}$) of the matrix $$\sum_{k=1}^{K} \lambda_k H_k^* H_k$$

has a multiplicity of one, then $w_{opt}$ and $\alpha_{opt}$ satisfies the primal problem posed in $\mathcal{P}_3$. More precisely, $G = w^*_{opt} H_k H_k w_{opt} \geq \alpha_{opt}$ for all k=1, ..., K, and $\alpha_{opt}$ is the optimal value of the objective function in $\mathcal{P}_3$.

In order to prove Theorem 1, a more general result stated in the following theorem is proven.

Theorem 2: Let X be a compact metric space and $\mathcal{P}(X)$ be the space of probability measures on X. Let $f_1, f_2, ..., f_K$ be non-negative and non-zero continuous functions on X. Then the following statements (A)-(D) hold:

(A) Duality:

$$\max\left\{\sum_{k=1}^{K} \lambda_k \,\middle|\, \forall k : \lambda_k \geq 0, \forall x \in X : \sum_{k=1}^{K} \lambda_k f_k(x) \leq 1\right\} = \quad (75)$$

$$\frac{1}{\max_\mu \min_k \int f_k d\mu}$$

(B) Existence of maximizer:

$$\exists \mu_0 \in \mathcal{P}(X) \text{ such that } \max_\mu \min_k \int f_k d\mu = \min_k \int f_k d\mu_0 \quad (76)$$

(C) The boundary condition: Assume that $\lambda_1, ..., \lambda_K$ give us the maximum in the left hand side of Equation (75). Then for $\mu_0$ at almost every point we have $$\sum_{k=1}^{K} \lambda_k f_k(x) = 1. \quad (77)$$

(D) Uniqueness condition: If furthermore it is assumed that $$\exists ! x_0 \in X \text{ such that } \sum_{k=1}^{K} \lambda_k f_k(x_0) = 1 \quad (78)$$

then (D1) $\mu_0$ is $\delta_{x_0}$, the Dirac measure supported at the point $x_0$;

(D2)

$$\sum_{k=1}^{K} \lambda_k = \frac{1}{\min_k f_k(x_0)};$$

and (D3) For any k either $$\lambda_k = 0 \text{ or } f_k(x_0) = \frac{1}{\sum_{k=1}^{K} \lambda_k}.$$

Proof of Theorem 2: Parts (A), (B) and (C) can be proven simultaneously. In order to prove the equality in the part (A), we prove that each side is not larger than the other side. For any $\lambda_k$ and a probability measure $\mu$ on X, we have $$\sum_{k=1}^{K} \lambda_k f_k(x) \leq 1 \Rightarrow \sum_{k=1}^{K} \lambda_k \int f_k d\mu \leq 1 \qquad (79)$$

$$\Rightarrow \left(\sum_{k=1}^{K} \lambda_k\right) \min_j \int f_j d\mu \leq 1 \qquad (80)$$

Therefore, $$\left(\sum_{k=1}^{K} \lambda_k\right) \cdot \left(\max_\mu \min_j \int f_j d\mu\right) \leq 1 \qquad (81)$$

Because $f_k$ are non-zero, both sides can be divided by $$\max_\mu \min_j \int f_j d\mu.$$

Thus, $$\sum_{k=1}^{K} \lambda_k \leq \frac{1}{\max_\mu \min_j \int f_j d\mu} \qquad (82)$$

which proves one side of the inequality.

In order to prove the other side of this inequality, we start with $\{x_k\}_{k=1}^{\infty}$ a dense subset of X and define $$\Omega_n = \left\{ \underline{\lambda} \mid \forall k, \lambda_k \geq 0 \text{ and } \sum_{k=1}^{K} \lambda_k f_k(x_j) \leq 1 \forall j, 1 \leq j \leq n \right\} \qquad (83)$$

We note that by the definition $\Omega_{n+1} \subset \Omega_n$. Moreover since $f_k$ are continuous functions and $\{x_k\}$ is a dense subset of X, we have $\cap_n \Omega_n = \Omega$, where $$\Omega = \left\{ \underline{\lambda} \mid \forall k, \lambda_k \geq 0 \text{ and } \sum_{k=1}^{K} \lambda_k f_k(x) \leq 1 \forall x \in X \right\}. \qquad (84)$$

In addition, for large enough n, $\Omega_n$ are bounded subsets as $f_k$ are non-zero, non-negative and continuous.

Now we prove that as n goes to infinity $$\max_{\underline{\lambda} \in \Omega_n} \sum_{k=1}^{K} \lambda_k \to \max_{\underline{\lambda} \in \Omega} \sum_{k=1}^{K} \lambda_k \qquad (85)$$

For any n choose $\underline{\lambda}^{(n)} \in \Omega_n$ such that $$\max_{\underline{\lambda} \in \Omega_n} \sum_{k=1}^{K} \lambda_k = \sum_{k=1}^{K} \lambda_k^{(n)} \qquad (86)$$

Because $\underline{\lambda}^{(n)} \in \Omega_n$ is in a bounded and closed subset of $R^K$, there exists a subsequence of $\{\underline{\lambda}^{(n)}\}$ that converges to a vector $\underline{\lambda}$. On the other hand, since $\Omega = \cap_n \Omega_n$, $\underline{\lambda} \in \Omega$. Hence $$\sum_{k=1}^{K} \lambda_k^{(n)} \to \sum_{k=1}^{K} \lambda_k. \qquad (87)$$

On the other hand, we have $$\forall n: \sum_{k=1}^{K} \lambda_k^{(n)} \geq \max_{\underline{\lambda}' \in \Omega} \sum_{k=1}^{K} \lambda_k'. \qquad (88)$$

By letting n go to infinity, $$\sum_{k=1}^{K} \lambda_k \geq \max_{\underline{\lambda}' \in \Omega} \sum_{k=1}^{K} \lambda_k'. \qquad (89)$$

Therefore $$\sum_{k=1}^{K} \lambda_k = \max_{\underline{\lambda}' \in \Omega} \sum_{k=1}^{K} \lambda_k', \qquad (90)$$

which shows the above-claim.

For any n, by the Strong Duality of the Linear Programming, we have $$\max_{\underline{\lambda} \in \Omega_n} \sum_{k=1}^{K} \lambda_k = \qquad (91)$$

$$\min\left\{ \sum_{j=1}^{n} \beta(x_j) \middle| \beta: \{x_1, x_2, \ldots, x_n\} \to R^{\geq 0}, \sum_{j=1}^{n} \beta(x_j) f_k(x_j) \geq 1 \forall k \right\}$$

$$= \min\left\{ \frac{1}{\min_j \int f_j d\mu} \middle| \mu \in \mathcal{P}\{x_1, x_2, \ldots, x_n\} \right\} \qquad (92)$$

Let $\mu_n \in \mathcal{P}(X)$ be chosen such that $$\max_{\underline{\lambda} \in \Omega_n} \sum_{k=1}^{K} \lambda_k = \frac{1}{\min_j \int f_j d\mu_n} \qquad (93)$$

Because X is a compact space, $\mathcal{P}(X)$ is also a compact space with respect to weak-* topology. Hence, there is a subsequence of $\mu_n$ which converges to $\mu_0 \in \mathcal{P}(X)$. In particular, we have $$\frac{1}{\min_j \int f_j d\mu_n} \to \frac{1}{\min_j \int f_j d\mu_0} \qquad (94)$$

On the other hand, we also have $$\max_{\lambda \in \Omega_n} \sum_{k=1}^{K} \lambda_k \to \max_{\lambda \in \Omega} \sum_{k=1}^{K} \lambda_k \quad (95)$$

Therefore, $$\max_{\lambda \in \Omega} \sum_{k=1}^{K} \lambda_k = \frac{1}{\min_j \int f_j d\mu_0}, \quad (96)$$

which completes the proof of parts (A) and (B).

It is noted that because of $$\sum_{k=1}^{K} \lambda_k = \max_{\lambda' \in \Omega} \sum_{k=1}^{K} \lambda'_k \quad (97)$$

we have $$1 = \left(\sum_{k=1}^{K} \lambda_k\right)\left(\min_j \int f_j d\mu_0\right) \quad (98)$$

$$\leq \sum_{k=1}^{K} \lambda_k \int f_k d\mu_0 \quad (99)$$

$$= \int \sum_{k=1}^{K} \lambda_k f_k d\mu_0 \quad (100)$$

Therefore, $$\int \left(\sum_{k=1}^{K} \lambda_k f_k - 1\right) d\mu_0 \geq 0 \quad (101)$$

and considering that $\Sigma_{k=1}^{K} \lambda_k f_k - 1 \leq 0$, we conclude that for $\mu_0$ almost every point $x \in X$ we have $$\sum_{k=1}^{K} \lambda_k f_k(x) = 1 \quad (102)$$

that gives us the part (C).

Part (D1) is a direct consequence of our uniqueness assumption and part (C). Part (D2) is a corollary of parts (D1), (A) and (B). In order to prove part (D3), it is enough to notice that by part (D2) and our assumption we have $$0 = \sum_k \lambda_k \left(f_k(x_0) - \min_j f_j(x_0)\right). \quad (103)$$

Proof of Theorem 1: We apply Theorem 2 in the following setting. Let $X=P(R^K)$ be the projective space, i.e. the sphere of radius one in $R^K$ after identifying $v$ with $-v$. For any unit vector $v$, we define $$f_k(v) = v^T H^*_k H_k v. \quad (104)$$

Hence, for given $\lambda_k$, we have $\Sigma_k \lambda_k f_x(x) \leq 1$ for any $x \in X$ if and only if $I_K - \Sigma_k \lambda_k H^*_k H_k$ is a semi-positive definite matrix. Moreover, a unit vector $v$ is in the null space of $I_K - \Sigma_k \lambda_k H^*_k H_k$ if and only if $\Sigma_k \lambda_k f_x(v) = 1$. Thus one can easily deduce the desired result from Theorem 2.

Figure 5:
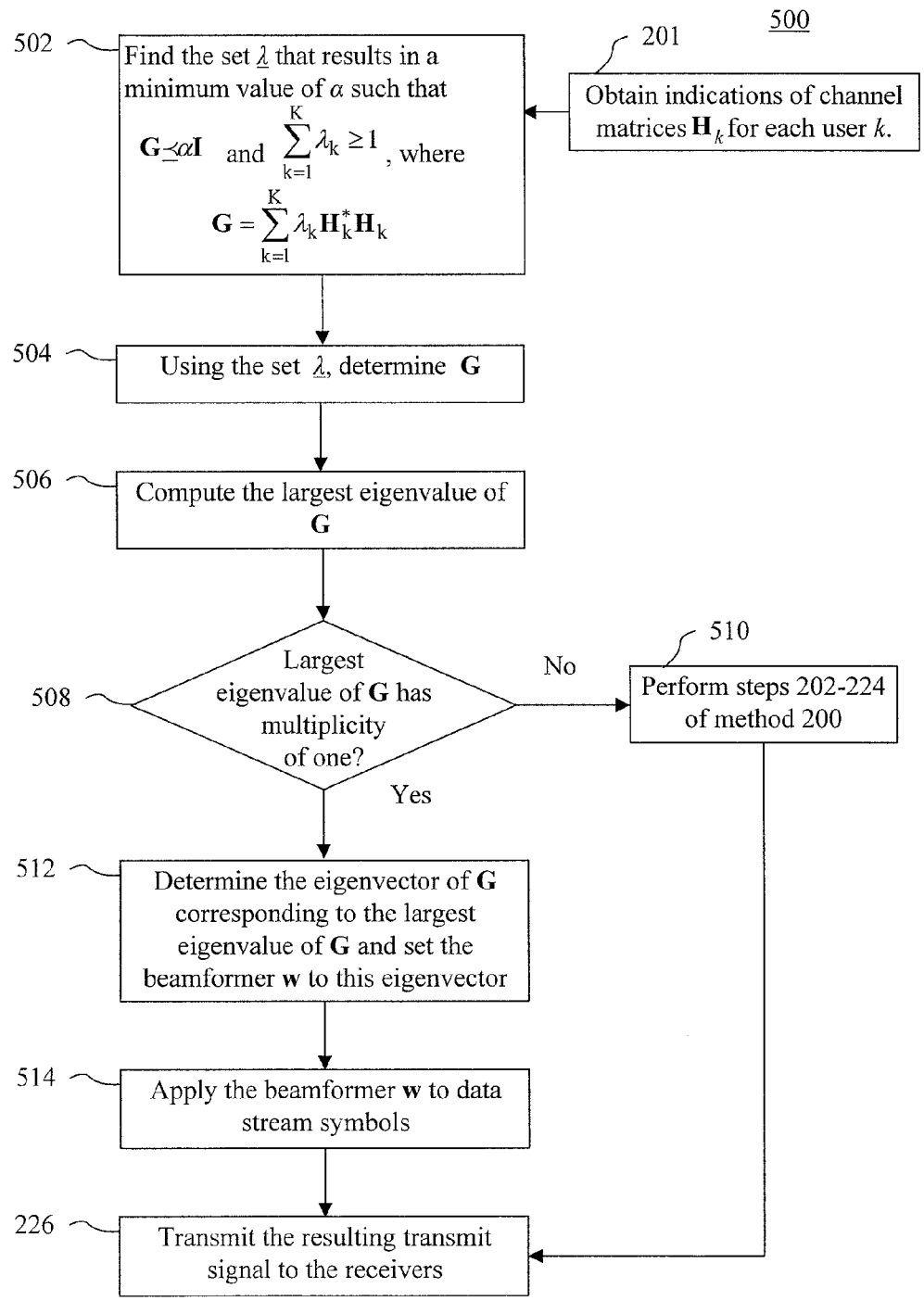
FIG. 5 is a high-level block/flow diagram of an embodiment of an alternative method for determining a beamforming matrix that accounts for a hidden convexity in the optimization problem.

With reference now to FIG. 5, with continuing reference to FIGS. 1-3, an exemplary embodiment 500 of a method for determining a beamforming vector or precoder in the short term multicasting scenario that accounts for the hidden convexity in the optimization problem is illustrated. An exemplary algorithm, Algorithm 3 that implements an example of the method 500 is provided herein below in Table 3. In accordance with the method 500 and Algorithm 3, first, the dual formulation is solved and the existence of the optimal solution is checked. The optimal solution can be directly obtained through eigenvalue decomposition of the matrix G. If the multiplicity of the largest eigenvalue of G is more than one, then the greedy procedure described above with respect to method 200 and Algorithm 1 is applied.

TABLE 3

Algorithm 3
Algorithm 3:

Input. Channel matrices $h_k$, $1 \leq k \leq K$ and SNR threshold $\alpha > 0$.
Output. The beamforming vector w
1 Solve convex problem $P_4$ and find $\lambda_k$, k = 1,...,K
2 G ← $\Sigma_{k=1}^{K} \lambda_k H^*_k H_k$
3 if the largest eigenvalue of G has multiplicity one then
4   w = eigenvector of the largest eigenvalue G
5 else
6   Perform Algorithm 1
7 end if The method 500 can begin at step 201, at which the controller 306 of the base station 110 can obtain indications of channel matrices $H_k$ for each user k, as described above with regard to the method 200.

At step 502, the controller 306 can find the set of multipliers A that result in a minimum value of α such that $$\left(\sum_{k=1}^{K} \lambda_k H^*_k H_k\right) \leq \alpha I \text{ and } \sum_{k=1}^{K} \lambda_k \geq 1.$$

For example, as indicated in Algorithm 3 of Table 3, the controller 306 can solve $\mathcal{P}_4$ to find $\lambda_k$ for k=1, ..., K using semi-definite programming techniques. Here, we denote $\Sigma_{k=1}^{K} \lambda_k H^*_k H_k$ as G.

At step 504, the controller 306 can use the determined set $\underline{\lambda}$ to compute G and, at step 506, the controller 306 can compute the largest eigenvalue of G for the determined set $\underline{\lambda}$.

At step 508, the controller 306 can determine whether the largest eigenvalue of G has a multiplicity of one. In other words, the controller 306 determines whether the largest eigenvalue of G is unique. If not, then the method can proceed to step 510, at which the controller 306 can implement the suboptimal greedy procedure and perform steps 202-224 of the method 200 described above. If the largest eigenvalue of G has a multiplicity of one, then the optimal solution exists and the method can proceed to step 512, at which the controller 306 can determine the eigenvector of G corresponding to the largest eigenvalue of G. Further, the controller 306 can set the beamformer matrix w to this eigenvector. As indicated above, utilizing the convexity of the problem under these particular conditions to compute the beamformer is substantially more efficient and less complex than implementing the suboptimal greedy procedure. At step 516, the controller 306 can apply the beamformer w to the multicast data stream symbols x to generate a transmit signal x=wx for receipt by receivers 114 and 116. Thereafter, the method can proceed to step 226, at which the controller 306 can direct the transmitter 309 to transmit the resulting transmit signal to the receivers, as described above with respect to the method 200.

Having described preferred embodiments of link layer multicasting systems and methods (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A beamforming method comprising:
obtaining indications of channel matrices for a plurality of receivers; formulating a beamformer matrix as a linear combination of columns of hermitians of the channel matrices;
determining coefficients of the hermitians in the linear combination to compute the beamformer matrix such that a lowest reception rate among reception rates of each of the receivers is maximized; and
transmitting data signals to the receivers by applying the computed beamformer matrix to data symbols to maximize the lowest reception rate,
wherein the determining coefficients of the hermitians comprises successively orthogonalizing the channel matrices, and
wherein the orthogonalizing comprises determining a given orthogonal channel matrix of a receiver assigned a given index by orthogonailzing the given orthogonal channel matrix to each orthogonal channel matrix of receivers assigned indices that precede or succeed the given index.

2. The method of claim 1, further comprising selecting a permutation of an assignment of indices to the receivers and performing the successive orthogonalizing for the selected permutation.

3. The method of claim 2, further comprising selecting a plurality of permutations of an assignment of indices to the receivers and performing the successive orthogonalizing for each of the selected permutations to compute a plurality of corresponding beamforming matrices.

4. The method of claim 3, further comprising selecting a particular beamforming matrix from the plurality of beamforming matrices that maximizes the lowest reception rate and wherein the transmitting data signals comprises applying the particular beamformer matrix to the data symbols.

5. The method of claim 1, wherein the determining coefficients further comprises successively calculating each of the coefficients that are non-zero by satisfying a constraint with equality.

6. The method of claim 5, wherein the determining coefficients further comprises selecting a coefficient at each successive step that minimizes a norm of a corresponding, resulting beamforming matrix.

7. The method of claim 1, wherein the determining coefficients further comprises accounting for covariances of noise for the receivers.

8. The method of claim 1, wherein the obtaining comprises receiving a codebook index indicating at least one of a channel direction and channel gain from each of the receivers and wherein the determining comprises assessing a set of matrices that are closer, as determined by a distance metric, to a given codebook matrix denoted by the received codebook index than to codebook matrices denoted by other codebook indices.

9. A non-transitory computer readable storage medium comprising a computer readable program, wherein the computer readable program when executed on a computer causes the computer to:
obtain indications of channel matrices for a plurality of receivers;
formulate a beamformer matrix as a linear combination of columns of hermitians of the channel matrices;
determine coefficients of the hermitians in the linear combination to compute the beamformer matrix such that a lowest reception rate among reception rates of each of the receivers is maximized; and
apply the computed beamformer matrix to data symbols to generate transmit signals that maximize the lowest reception rate,
wherein the determining coefficients of the hermitians comprises successively orthogonalizing the channel matrices, and
wherein the orthogonalizing comprises determining a given orthogonal channel matrix of a receiver assigned a given index by orthogonailzing the given orthogonal channel matrix to each orthogonal channel matrix of receivers assigned indices that precede or succeed the given index.

* * * * *